United States Patent
Cushion et al.

(10) Patent No.: US 9,286,448 B2
(45) Date of Patent: Mar. 15, 2016

(54) ENHANCED SOFTWARE LICENSE MANAGEMENT

(76) Inventors: Grant Philip Cushion, Munich (DE); Peter Kwan, Sunnyvale, CA (US); Ajit Digambar Sabnis, Westford, MA (US)

( * ) Notice: Subject to any disclaimer, the term of this patent is extended or adjusted under 35 U.S.C. 154(b) by 988 days.

(21) Appl. No.: 12/797,012

(22) Filed: Jun. 9, 2010

(65) Prior Publication Data

US 2011/0307885 A1    Dec. 15, 2011

(51) Int. Cl.
*G06F 21/00* (2013.01)
*G06F 21/10* (2013.01)

(52) U.S. Cl.
CPC ................................ *G06F 21/105* (2013.01)

(58) Field of Classification Search
USPC ............ 705/59, 16, 21, 71; 380/44, 262, 278, 380/279
See application file for complete search history.

(56) References Cited

U.S. PATENT DOCUMENTS

| | | | | |
|---|---|---|---|---|
| 6,633,312 | B1* | 10/2003 | Rochford | H04L 43/0817 709/223 |
| 6,959,291 | B1* | 10/2005 | Armstrong | G06F 21/10 705/59 |
| 2008/0183626 | A1* | 7/2008 | Romero | G06F 21/105 705/59 |
| 2008/0276060 | A1* | 11/2008 | Bostrom | G06F 21/126 711/164 |
| 2011/0295999 | A1* | 12/2011 | Ferris et al. | 709/224 |

* cited by examiner

*Primary Examiner* — Dante Ravetti
(74) *Attorney, Agent, or Firm* — Sterne, Kessler, Goldstein & Fox P.L.L.C.

(57) ABSTRACT

Systems, methods, computer program product embodiments are provided for enhanced license management. An embodiment includes providing an asset management module for managing software license utilization in a computer processing environment, and allowing configuration of the asset management module to designate software license utilization based upon a containment level associated with virtualization capabilities of one or more computer processing systems within the computer processing environment.

19 Claims, 3 Drawing Sheets

ENHANCED SOFTWARE LICENSE MANAGEMENT

BACKGROUND

1. Field of the Invention

The present invention relates generally to data computing environments and, more particularly, to a system providing methodology for enhanced software license management.

2. Background Art

Managing software licenses within a large enterprise is becoming an increasingly complex task. Most corporations lack sophisticated tools to make sure licenses are properly managed. Multiple vendors, various licensing policy, complex purchasing contracts combined with evolving technologies makes license management a computing problem itself.

As part of the evolving technologies, hardware vendors continue to introduce higher performance hardware, such as packing more CPU (central processing unit) cores in a single CPU chip. Also, virtualization and partitioning capabilities provided by platform vendors are maturing for a wider range of hardware, from low end to high end. Accordingly, more and more, a situation of a higher licensing cost is being faced when migrating to new hardware, although additional compute capacity may not be required/desired. Further, trying to determine a fair license cost can be challenging, such as when doing server consolidation projects.

As machine virtualization and partitioning are becoming widely used within the computing industry, a need exists for a change to licensing policies to align with the evolution, including an approach to software license management that accounts for machine virtualization and partitioning, including support for sub-capacity licensing. The present invention addresses such a need.

BRIEF SUMMARY

Briefly stated, the invention includes system, method, computer program product embodiments and combinations and sub-combinations thereof for enhanced software license management. An embodiment includes providing an asset management module for managing software license utilization in a computer processing environment, and allowing configuration of the asset management module to designate software license utilization based upon a containment level associated with virtualization capabilities of one or more computer processing systems within the computer processing environment.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
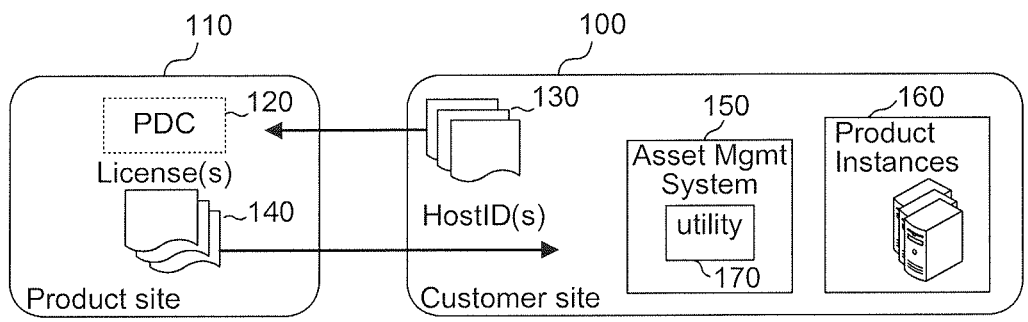
FIG. 1 illustrates a block diagram of a system for enhanced software license management in accordance with an embodiment of the present invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for providing methodology for enhanced software license management.

Referring now to the system diagram of FIG. 1, in a typical product order and installation process, initiation occurs when a customer at a customer site 100 makes and confirms a product order from a product site 110, such as by using an appropriate computing device, e.g., a personal desktop computer, a laptop computer, a handheld device, etc., that is capable of interacting via a suitable network communication connection, with the computing system(s) of the product site 110. Once the order is confirmed, the customer may access a product download center (PDC) 120 of the product site 110, such as by logging onto a company web page via the Internet, to enter the product and quantity selections. Also entered is the host-identifier information 130 for the system(s) at the customer site 100 which will be hosting the downloaded product. The necessary license(s) 140 are provided to the customer site 100 for installation on the appropriate system(s).

As is well understood in the art, the license(s) may be stored individually in each system that will run the downloaded product (the unserved license model) or in a server, e.g., an asset management system, 150 as a pool of licenses that will serve multiple server instances 160 of the product (the served license model). By way of example, in an embodiment, asset management system 150 is provided by SySAM (Sybase Software Asset Manager) from Sybase Inc of Dublin, Calif., for managing a suite of software products, such as multiple instances 160 of database management system software (DBMS), e.g., Adaptive Server Enterprise, also available from Sybase, Inc. It should be appreciated that although the entities of the customer site 100 are shown separately, this is meant as illustrative and not restrictive.

License delivery in this manner does not adequately address the ever increasing complex nature of emerging higher performance system capabilities. As machine virtualization and partitioning are becoming widely used within the computing industry, a change to licensing policies is needed to align with the evolution, including an approach to software license management that accounts for machine virtualization and partitioning, including support for sub-capacity licensing.

By way of background, when considering these evolving technologies, as is generally understood, there are multiple types of Partitioning, Virtualization, and Resource Management technologies available in the market. Sometimes there is more than one solution available from the same vendor to solve the same issue. The following discussion provides some background on various techniques and technologies currently known that apply in this space. In the subsequent description, product references in the examples to "HP" refer to the Hewlett-Packard Company of Palo Alto, Calif., to "IBM" refer to International Business Machines, Inc., of Armonk, N.Y., to "Sun" refer to Sun Microsystems of Santa Clara, Calif., and to "Microsoft" refer to Microsoft Corporation of Redmond, Wash.

In general, hardware partitioning, also referred to as hard partitioning or physical partitioning, has some identifying characteristics, including that its implementation occurs at the system board level, there is functional and electrical isolation of components, there is dedication of peripheral devices to a given partition, and availability typically is only on high end servers. Such configurations are relatively static, since changing allocated resources, such as CPUs and memory, generally requires bringing down the entire physical system for reconfiguration, although dynamic re-configuration of hard-partitions is emerging. Each partition in a hardware partition will have its own instance of the operating system (OS) and can be different from the other partitions. Examples of hardware partitioning include Sun Dynamic System Domains and HP nPAR.

Software partitioning, also referred as logical partitioning or virtual machines, typically is implemented via a software layer called "Hypervisor". The Hypervisor controls sharing/access of the hardware resources across all partitions. In software partitions, a given physical resource, such as CPU or memory, can be shared by multiple partitions based on defined sharing policies and configured quotas and can also be dynamically adjusted by a System Administrator without having to bring down the system. Where resources can be shared by multiple partitions, the management tools allow a System Administrator to dedicate specific resources to specific partitions, limit (cap) the maximum resources available to a partition at any give time, and adjust the allocated/shared resources. Each partition in a software partition will have its own instance of the operating system and can be different from the other partitions. Examples of software partitioning include Sun LDOM, IBM LPAR (& DLPAR), HP vPAR HP Integrity VM, VMware (ESX, Server, Workstation, Player etc), Linux Xen, and Microsoft Virtual Server.

Resource managers are governor programs that control access to various resources that a running program can utilize. On a single OS instance, a System Administrator can cap CPU and memory resources available to a given program. Resource managers are easy to implement for the purpose of resource governing without the overhead associated with any of the partitioning technologies. Examples of resource managers include Sun Resource Manager, IBM Workload Manager, and HP Process Resource Manager.

OS containers, also referred as OS virtualization, or OS containment, provide resource allocation behavior similar to resource managers but with the addition of security/isolation added between instances. Examples of OS Virtualization include Sun Solaris Containers/Zones, IBM WPAR, and HP Secure Resource Partitions.

In accordance with the embodiments of the invention, two types of licensing requirements are considered necessary to support these technologies, sub-capacity and shared capacity licensing. Sub-capacity licensing refers to those situations where a customer wants to license and run the chosen product software only on a section of the compute capacity, and shared-capacity licensing refers to those situations where the customer wants to fully license the physical capacity of the hardware and then have flexibility to partition and use the chosen product as they desire.

Such support does not occur in the typical approach, since asset management-enabled products currently request a license quantity appropriate to the number of processors that are available in the system where the product is running. However, since many operating systems report the 'system' as being the 'virtual system' in which the product is running, rather than reporting the 'system' as the physical machine as a whole, the license quantity is based on the processor count of the 'virtual system'. Although the license quantity is based on the 'virtual system', the ability to share licenses may not reflect this, e.g., a product running on multiple LPARs (logical partitions) of an IBM AIX POWER machine will request a license quantity appropriate to the maximum number of processors that can be used within each LPAR, however this does not account for the fact that the physical processing capacity may be shared by the various LPARs setup on the machine. To overcome such discrepancies, the present invention provides an enhanced approach to software license management, as described with reference to the overall block flow diagram represented in FIG. 2.

Figure 2:
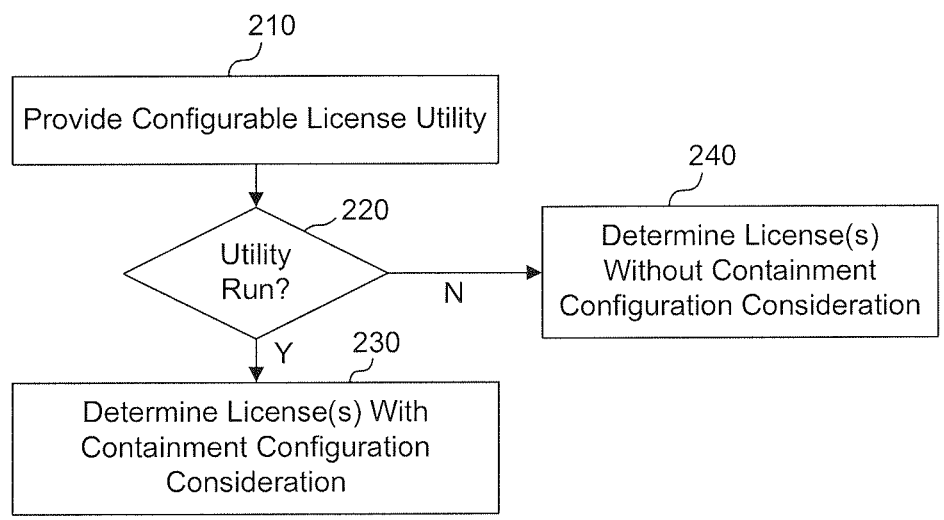
FIG. 2 is a flowchart illustrating an overall process by which enhanced software license management operates in accordance with an embodiment of the present invention.

Referring now to FIG. 2, in order to achieve enhanced software license management, a configurable license utility (170, FIG. 1) is provided for the asset management system 150 (block 210). When the utility is run (as identified via block 220), the license(s) needed are determined with consideration to a containment configuration (block 230). As generally understood, all operating system virtualization mechanisms provide a containment hierarchy which affects what resources are available, and typically, a physical machine can be partitioned into multiple logical partitions (or virtual machines), which can be further sub-divided into virtualized environments governed by resource managers and lower level process limitations. Rather than duplicating the containment hierarchy of every operating system, the categories of a complete machine category, a virtual/logical partition (virtual machine) category, and a category for the processor resource restrictions imposed on a program, are considered sufficient for specifying containment configuration. Based on these categories, a user can establish a containment level for the necessary control to partition the machine as they desire, override any excessive license quantity by controlling the processor resources that can be used by the program, and also allow the of licensing of the whole machine when heavily utilized by a product, which may require less licenses than the sum of the parts.

In accordance with an embodiment, to have license(s) determined with consideration of containment configuration, the desired containment level needs to be specified. By way of example, for the SySAM environment, containment levels labeled as "machine", "partition", or "resource" are suitable and capably of being specified via running of the configurable license utility by a command using the format % sysamcap{machine|partition|resourceset [resourceset_name]|default}[-v]

In this example, the specification of a resourceset_name is optional and allows use of a different name than the name that is constraining the utility (e.g., to obviate the need to bind the utility to the same resource-set that the product is bound to). Allowing the specification of additional information for the "machine" or "partition" parameters is considered unnecessary, since there is only one machine and the product can only be running in one partition, as is well appreciated by those skilled in the art. The following examples help illustrate the configurability for different containment levels based on such a format.

Example 1

Machine-Wide Licensing Override

Suppose an IBM machine with 2 processor cores is split into 4 LPARs each of which is limited to using 1 processor core. Without configuration consideration, the asset management system 150 will require one license per LPAR that the product is running on, which could result in a total of 4 licenses being required. If the customer wants to run the product on 3 or more LPARs, then they would configure the asset management system 150 to use machine-wide licensing via the running of the configurable license utility 160, e.g., sysamcap machine, which would result in each product checking out a quantity of 2 licenses (for the machine) and sharing the same licenses.

Example 2

Partition-Wide Licensing Override

Suppose a Sun machine with 32 processor cores has a Solaris LDOM which is capped to use 8 CPUs. This LDOM has 16 instances of the product, each instance running in a different resource pool, which each allow use of 1 processor. Configuring the asset management system 150 to use machine-wide licensing would not be acceptable, since this would result in 32 licenses being required. With the overlap in the processor cores used by each resource pool, configuring the asset management system 150 to use resource-set-wide licensing would also be unacceptable, since 16 licenses would be required. Thus, for this example, a better approach would be to configure the asset management system 150 to use partition-wide licensing, e.g., sysamcap partition, which would result in each product checking out a quantity of 8 licenses (for the partition) and sharing the same licenses.

Example 3

Resource-Wide Licensing Override

Suppose an HP machine with 32 processor cores has 8 vPar (virtual partitions) each of which are capped to 4 CPUs. Only one instance of the product is running, and it only requires a fraction of the processor time required by other products running on the system. In this example, the customer can use the Process Resource Manager to limit the product to using a maximum of 1 processor and thus only requiring 1 license, and configure the license determination via. sysamcap resourceset.

Depending on how the resource-set is configured and its visibility across multiple-machine partitions will determine whether the same resources can be shared across logical partitions, as is well understood in the art.

Figure 3:
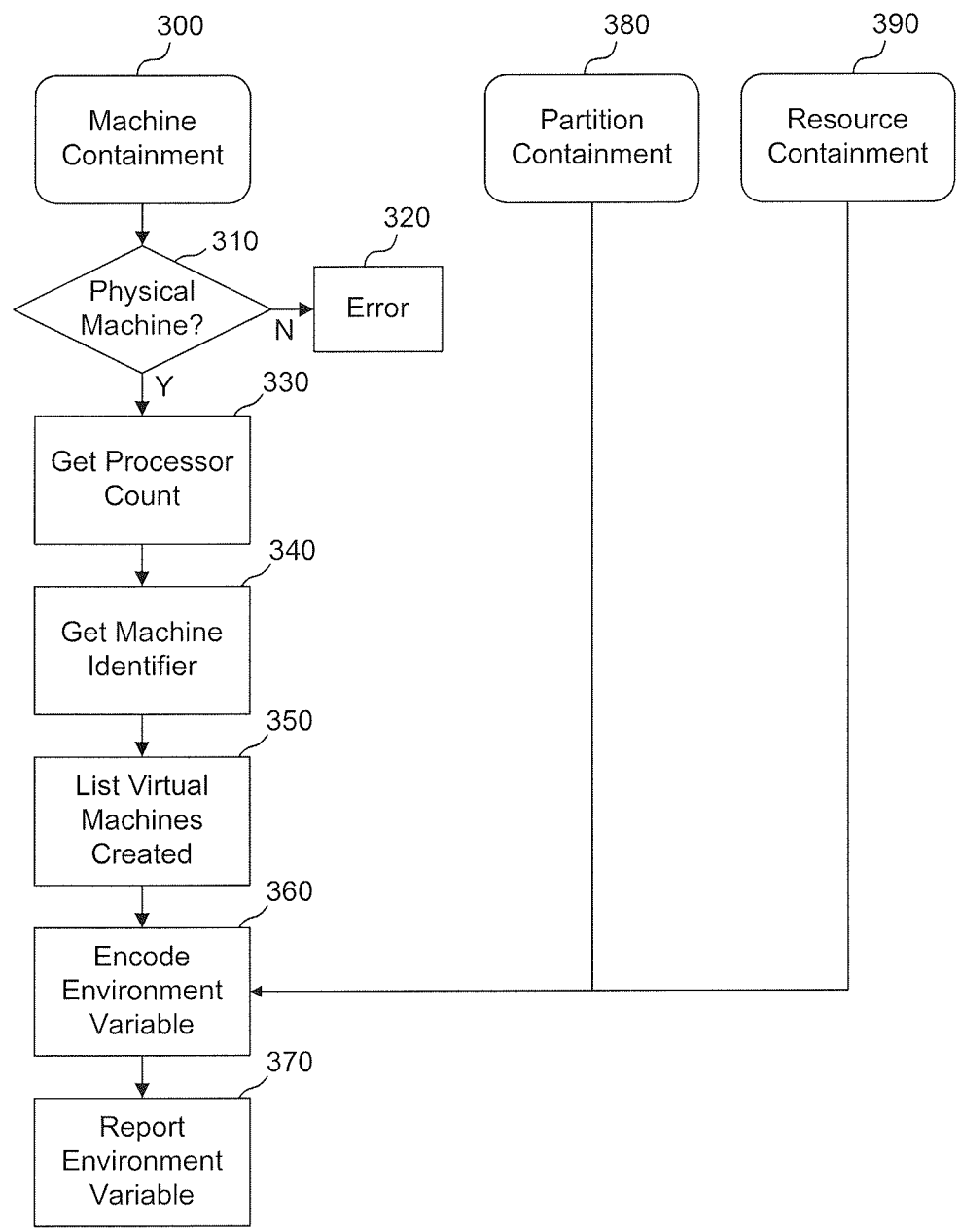
FIG. 3 is a flowchart illustrating an overall process for the license determination with containment level consideration of FIG. 2 in accordance with an embodiment of the present invention.

Referring now to FIG. 3, a block flow diagram represents a process for license determination with containment level consideration. As shown, the flow depends upon which containment level is specified.

For a specified containment level of "machine" (block 300), the process includes checking that the containment level is a physical machine (block 310). If not true, an error is raised (block 320). If true, then a count of the processors for the machine is identified (block 330), as well as an identifier for the machine (block 340). Further, a list of all the virtual machines that have been created is formed (block 350). In an embodiment, OS tools or VM technology provided by the technology vendor is used to obtain a list of virtual machines/logical partitions. Then, an environment variable is encoded (block 360) and reported (block 370), as described further herein below.

For the specified containment levels of "partition" (block 380) or "resource" (block 390), the process includes the encoding and reporting of an environment variable (blocks 360 and 370). Of course, the utility will also report the host-id that would need to be used for any un-served licenses to be used at the specified containment level, as presented in the following examples. It should be appreciated that although the following examples present reporting of an environment variable by output, this is meant as illustrative and not restrictive, so that using an alternate mechanism for reporting, such as writing a properties file, or auto-configuration, or the like, may also be used.

By way of example, using the aforementioned SySAM format, an input of

% sysamcap resourceset resourceset_name provides an output of:

```
Set the following environment variable prior to
starting the product. This only needs to be done
once for each instance of the product that will
run.
    SYBASE_SAM_CAPACITY=RESOURCE, resourceset_name
Sybase recommends use of a SySAM License Server,
but if you wish to generate un-served licenses
for using the product within this resource-set
then you will need to specify the following host-
id when generating licenses at the Sybase Product
Download Center.
    RESOURCESET-ID=0ab34cde-RSET-resourceset_name
```

If the resource-set name is not specified, then the utility will return the name and host-id for the resource-set that it is constrained by, which may not be the same as that which constrains the product.

In another example, to revert to default behavior the customer can specify the value "default" and set the environment variable reported by it, once, prior to starting each instance of the product, e.g. an input of:

sysamcap default results in an output of:

```
Set the following environment variable prior to
starting the product. This only needs to be done
once for each instance of the product that will
run.
    SYBASE_SAM_CAPACITY=DEFAULT
Sybase recommends use of a SySAM License Server,
but if you wish to generate un-served licenses
for using the product then you will need to
specify the following host-id when generating
licenses at the Sybase Product Download Center.
    89abcdef
```

On isolated virtual partitions, i.e. operating systems where it is not possible to obtain information about the physical machine from within a machine partition (all bar AIX and HP-UX), in an embodiment, the utility must be run from the machine itself, rather than on the machine-partition. In such situations, the environment variable reported contains encrypted information that allows the asset management system to verify that the system it is running on is on the same machine that the utility was run on, e.g., an input of
%  sysamcap machine
results in an output of:

---
Set the following environment variable prior to
starting the product. This only needs to be done
once for each instance of the product that will
run.
    SYBASE_SAM_CAPACITY=MACHINE: 0123456789abcdef012
Sybase recommends use of a SySAM License Server,
but if you wish to generate un-served licenses
for using the product on this machine then you
will need to specify the following host-id when
generating licenses at the Sybase Product
Download Center.
    MACHINE-ID=01ab34cd

---

The encrypted hexadecimal string information suitably contains machine-wide processor counts, and additionally system-id and partition-id information that will allow verification that the product is running on the same machine where the environment variable was generated. The environment variable is machine specific (it associates the specific physical machine with its partitions), is static (requiring the re-running of the utility for any new partitions added to the machine), and is not product specific (the same environment variable would be set before running any asset management system-enabled product). However, it is anticipated that platform vendors will provide a means of identifying whether a virtual machine is part of a specific physical machine, thus obviating the need to build a partition list and re-run the utility when new partitions are added.

As indicated by these example outputs, the reported environment variable gets set by the user for the desired containment level, once, prior to starting the product. In an embodiment, the environment variable is stored in an asset management properties file for that instance of the product, so as not to be required on subsequent invocations and to allow products to provide a front-end to this mechanism if desired (e.g., such as via a product installer).

In the event that the information exceeds the maximum that can fit into an environment variable, multiple environment variables may be reported with specification as to which partition each must be used in, e.g.

---
    Machine Level Environment Variable to set in
    PTN1, PTN2, and PTN3:
        SYBASE_SAM_CAPACITY=MACHINE,bcdef1234567890abce
    Machine Level Environment Variable to set in
    PTN4, PTN5, and PTN6:
        SYBASE_SAM_CAPACITY=MACHINE,7890abcdef123456789
    Sybase recommends use of a SySAM License Server,
    but if you wish to generate un-served licenses
    for using the product then you will need to
    specify the following host-id when generating
    licenses at the Sybase Product Download Center.
        89abcdef

---

A decision to configure an alternative asset management system behavior depends upon which level of licensing results in the fewest licenses being required for their virtualized environment. For example, if multiple machines have been consolidated into a single machine with more processors, then it may be cheaper to license each partition instead of licensing the machine as a whole. Or, it may be that the product only requires minimal resources, and it could be limited to run on a single processor, for example, thus only requiring a single license.

Referring again to FIG. 2, if configuration is not desired, i.e., when the utility is not run (block 220 is negative), the asset management operates according to the prior art approach, and thus determines the license(s) without consideration to a containment level (block 240). By default, therefore, the asset management system 150 maintains its existing behavior, unless the configurable license utility is executed and the environment variable that is returned gets set prior to starting the desired program. In this manner, rather than merely requesting a license quantity appropriate for the machine, or machine partition if running in a partitioned environment, as previously, now the license sharing is modifiable, with licenses shared only with other instances of the product running at the same containment level.

As described, when running a product in a virtualized environment, it is necessary to explicitly configure the asset management system 150 to modify the licensing behavior in order to license the complete physical machine or license a specific machine-partition or license a specific resource-partition. In each case, a license quantity is checked out that is commensurate with the number of processors available at the configured containment level and licenses are shared with other instances of the same product running at the same level. Since licenses are for a specific level of containment, their use by an application running elsewhere on the machine is not possible, e.g. a license for an AIX LPAR would not be usable for a different LPAR on the same machine. Further, it is noted that if a license is restricted for use on a machine with a maximum number of processor cores or chips, then the processor count of the machine itself and not the machine partition is used.

Through the aspects of the invention, enhanced licensing management is achieved that supports both shared-capacity and sub-capacity licensing, so that the quantity of licenses required is based on the number of processors that a product can use, rather than necessitating a license for every processor on the machine as a whole. In this manner, the need to have flexibility and fairness in software licensing as technology evolves is met in an efficient and straightforward approach.

Figure 4:
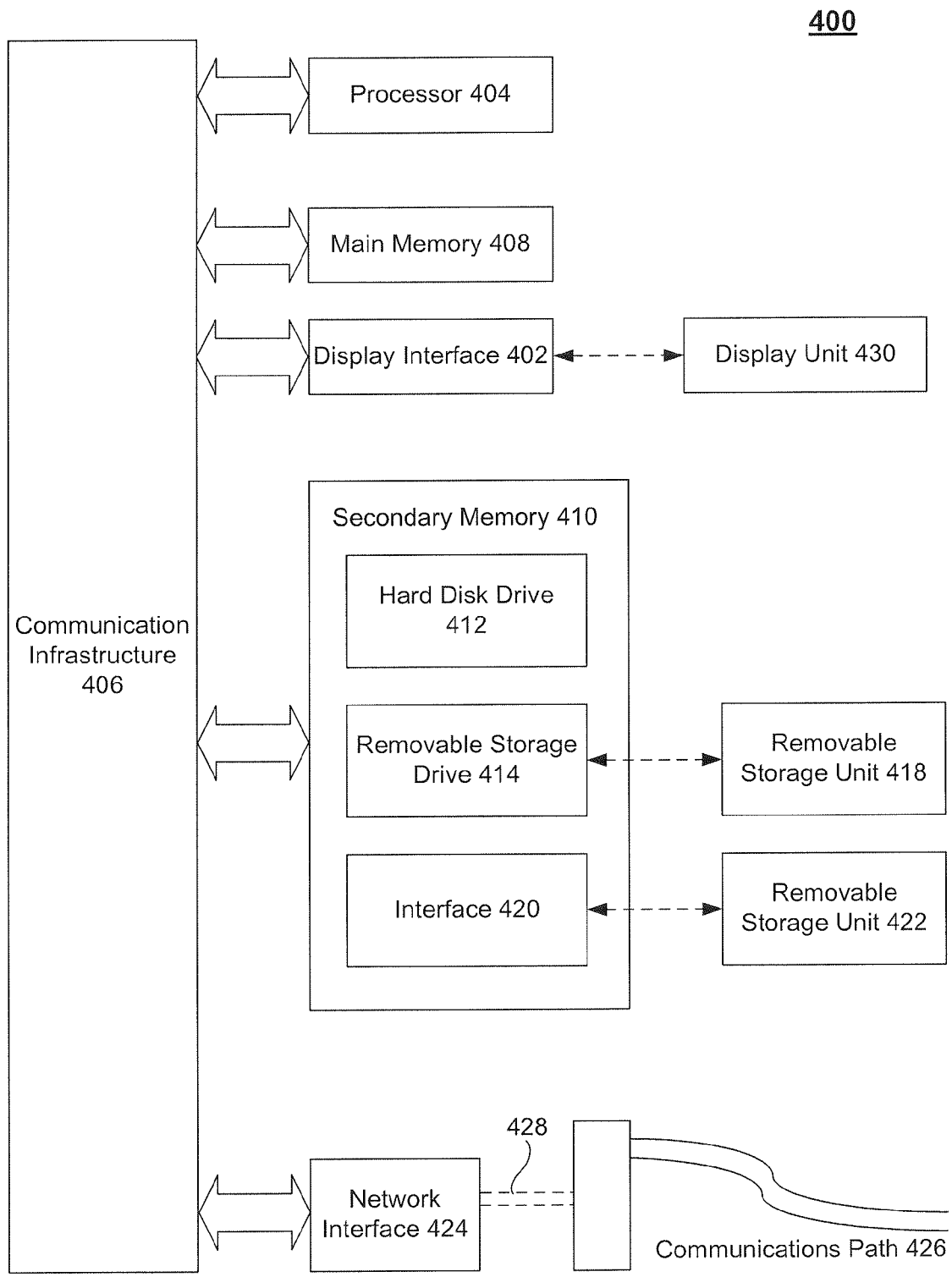
FIG. 4 illustrates an example computer useful for implementing components of embodiments of the invention.

Various aspects of the present invention can be implemented by software, firmware, hardware, or a combination thereof. FIG. 4 illustrates an example computer system 400 in which the present invention, or portions thereof, can be implemented as computer-readable code. For example, the methods illustrated by flowcharts of FIG. 2 and FIG. 3 can be implemented in system 400. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 404. Processor 404 can be a special purpose or a general purpose processor. Processor 404 is connected to a communication infrastructure 406 (for example, a bus or network).

Computer system 400 also includes a main memory 408, preferably random access memory (RAM), and may also include a secondary memory 410. Secondary memory 410 may include, for example, a hard disk drive 412, a removable storage drive 414, and/or a memory stick. Removable storage drive 414 may comprise a floppy disk drive, a magnetic tape drive, an optical disk drive, a flash memory, or the like. The removable storage drive 414 reads from and/or writes to a removable storage unit 418 in a well known manner. Removable storage unit 418 may comprise a floppy disk, magnetic tape, optical disk, etc. which is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals which may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Signals carried over communications path 426 can also embody the logic described herein. Computer program medium and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the present invention as discussed herein. In particular, the computer programs, when executed, enable processor 404 to implement the processes of the present invention, such as the method illustrated by the flowcharts of FIG. 2 and FIG. 3. Accordingly, such computer programs represent controllers of the computer system 400. Where the invention is implemented using software, the software may be stored in a computer program product and loaded into computer system 400 using removable storage drive 414, interface 420, hard drive 412 or communications interface 424.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. For example, while the embodiments refer to a user specifying the configuration, this is considered necessary as a result of current technical infeasibility to determine the license requirements at runtime, mainly due to the fact that machine-partitions are often isolated from each other. This machine isolation does not allow a way to know that the partitions are on the same machine and should share licenses unless the user configures the asset management system with this information. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for enhanced license management in a computer processing environment, the method comprising:

receiving, by a processor operating on one or more virtualized computer processing systems in a second computer processing environment, one or more software licenses allocated to the second computer processing environment, as received from one or more processors operating on one or more virtualized computer processing systems in a first computer processing environment;

managing, by the processor operating on the one or more virtualized computer processing systems in the second computer processing environment, the received software licenses across a virtualized computer processing system of the second computer processing environment;

determining, by the processor operating on the one or more virtualized computer processing systems in the second computer processing environment, a containment level, wherein the containment level is one of a machine containment level, a partition containment level, or a resource containment level;

based on a determination, by the processor operating on the one or more virtualized computer processing systems in the second computer processing environment, that the containment level is a physical machine, counting the processors for that determined physical machine and retrieving a physical machine identifier;

assigning, by the processor operating on the one or more virtualized computer processing systems in the second computer processing environment, the received licenses to a respective virtualized computer processing system;

determining, by the processor operating on the one or more virtualized computer processing systems in the second computer processing environment, that the assigned software licenses are used to operate a computer program within the virtualized computer processing system;

determining, by the processor operating on the one or more virtualized computer processing systems in the second computer processing environment, based on the containment level, a Quantity of licenses needed to operate the computer program in the second computer processing environment;

assigning, by the processor operating on the one or more virtualized computer processing systems in the second computer processing environment, the determined Quantity of licenses to the one or more virtualized computer processing systems of the second computer processing environment as specified by the containment level; and running, by the processor operating on the one or more virtualized computer processing systems in the second computer processing environment, the computer program in the one or more virtualized computer systems of the second processing environment.

2. The method of claim 1, wherein the counting, by the asset management module of the second computer processing environment, comprises:

determining that the machine containment level specifies that the quantity of licenses associated with the software license utilization is based on a number of processors of the one or more virtualized computer processing systems.

3. The method of claim 1, wherein the determining the containment level, by the asset management module of the second computer processing environment, comprises:

determining that the partition containment level specifies that the quantity of licenses associated with the software license utilization is based on a virtual partitioning of one or more of the virtualized computer processing systems.

4. The method of claim 1, wherein the determining the containment level, by the asset management module of the second computer processing environment, comprises:

determining that the resource partition containment level specifies that the quantity of licenses associated with the software license utilization is based on which of one or more operating systems of the one or more virtualized computer processing systems are specified for operating the computer program.

5. The method of claim 1, further comprising controlling license sharing among one or more instances of the computer program at the containment level, wherein the one or more instances do not exceed the quantity of licenses to operate the computer program as determined as specified by the software license utilization.

6. The method of claim 1, further comprising:

accessing, by the asset management module, an asset management utility that determines a software license utilization for the Quantity of software licenses allocated for the computer program based on the containment level.

7. The method of claim 1, further comprising:

using the determined licenses and the virtualization capabilities of the one or more virtualized computer processing systems as specified by the containment level, wherein the containment level indicates which of the virtualization capabilities of the one or more virtualized computer processing systems are available, using a fewest number of licenses, to operate the computer program on the one or more virtualized computer processing systems in the second computer processing environment.

8. The method of claim 7, further comprising receiving an environment variable, indicating license entitlement of the determined licenses for the virtualization capabilities of the one or more virtualized computer processing systems.

9. The method of claim 6, further comprising:

receiving, by the asset management module, the containment level from a user.

10. A non-transitory computer-readable storage device having computer-executable instructions stored thereon, execution of which, by a computing device, causes the computing device to perform operations comprising:

receiving, by a processor operating on one or more virtualized computer processing systems in a second computer processing environment, one or more software licenses allocated to the second computer processing environment, as received from one or more processors operating on one or more virtualized computer processing systems in a first computer processing environment;

managing, by the processor operating on the one or more virtualized computer processing systems in the second computer processing environment, the received software licenses across a virtualized computer processing system of the second computer processing environment;

determining, by the processor operating on the one or more virtualized computer processing systems in the second computer processing environment, a containment level, wherein the containment level is one of a machine containment level, a partition containment level, or a resource containment level;

based on a determination, by the processor operating on the one or more virtualized computer processing systems in the second computer processing environment, that the containment level is a physical machine, counting the processors for that determined physical machine and retrieving a physical machine identifier;

assigning, by the processor operating on the one or more virtualized computer processing systems in the second computer processing environment, the received licenses to a respective virtualized computer processing system;

determining, by the processor operating on the one or more virtualized computer processing systems in the second computer processing environment, that the assigned software licenses are used to operate a computer program within the virtualized computer processing system;

determining, by the processor operating on the one or more virtualized computer processing systems in the second computer processing environment, based on the containment level, a quantity of licenses needed to operate the computer program in the second computer processing environment;

assigning, by the processor operating on the one or more virtualized computer processing systems in the second computer processing environment, the determined Quantity of licenses to the one or more virtualized computer processing systems of the second computer processing environment as specified by the containment level; and running, by the processor operating on the one or more virtualized computer processing systems in the second computer processing environment, the computer program in the one or more virtualized computer systems of the second processing environment.

11. The computer-readable storage device of claim 10, the operations further comprising:

controlling license sharing among one or more instances of a computer program at the containment level during an operation of the computer program.

12. The computer-readable storage device of claim 10, wherein the machine containment level specifies that the quantity of licenses associated with the software license utilization is based on a number of processors of the one or more virtualized computer processing systems.

13. The computer-readable storage device of claim 10, the operations further comprising:
receiving an environment variable indicating which partition of a particular machine on which the computer program is to operate.

14. A system for enhanced license management, the system comprising:
a first computer processing system; and
a second computer processing system comprising an asset management module operating on a processor of one or more virtualized computer processing systems of the second computer processing system;
A non-transitory computer-readable storage device having computer-executable instructions stored thereon, execution of which, by the second computing processing system, causes the second computing processing system to perform operations comprising:
receiving one or more software licenses allocated to the second computer processing environment, as received from one or more processors operating on one or more virtualized computer processing systems in a first computer processing environment;
managing the received number of software licenses across a virtualized computer processing system of the second computer processing environment;
determining a containment level, wherein the containment level is one of a machine containment level, a partition containment level, or a resource containment level;
based on a determination that the containment level is a physical machine, count the processors for that determined physical machine and retrieving a physical machine identifier;
assigning the received licenses to a respective virtualized computer processing system;
determining that the assigned software licenses are used to operate a computer program within the virtualized computer processing system;
determining a quantity of licenses needed to operate the computer program in the second computer processing environment based on the containment level;
assigning the determined Quantity of licenses to the one or more virtualized computer processing systems of the second computer processing environment as specified by the containment level; and
running the computer program in the one or more virtualized computer systems of the second processing environment.

15. The system of claim 14, wherein the second computer processing system perform operations comprising:
sharing license among one or more instances of the computer program at the containment level.

16. The system of claim 14, wherein the asset management module determines the software license utilization of the computer program based on the containment level during an operation of the asset management module.

17. The system of claim 16, wherein the asset management module receives an environment variable indicating license entitlement for the first computer processing system.

18. The computer-readable storage device of claim 10, wherein the machine containment level indicates that a software license is allocated to each logical partition of the second processing environment, wherein the partition wide indicates that a software license is allocated to each central processing unit of the second processing environment, and wherein the resource wide indicates that a software license is allocated to a particular processor of the second processing environment.

19. The method of claim 1, further comprising:
determining the containment level to have changed from a first containment level indicating one of the machine, partition, or resource containment level, to be a second containment level different from the first containment level.

* * * * *